(12) United States Patent
Hiraoka

(10) Patent No.: US 7,962,027 B2
(45) Date of Patent: Jun. 14, 2011

(54) IMAGE PICKUP APPARATUS

(75) Inventor: Akira Hiraoka, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/576,112

(22) Filed: Oct. 8, 2009

(65) Prior Publication Data
US 2010/0098395 A1   Apr. 22, 2010

(30) Foreign Application Priority Data
Oct. 16, 2008  (JP) .................................. 2008-267492

(51) Int. Cl.
*G03B 17/00* (2006.01)
(52) U.S. Cl. .......................................... 396/80; 396/543
(58) Field of Classification Search ............ 396/80, 396/543
See application file for complete search history.

(56) References Cited

U.S. PATENT DOCUMENTS

| | | | | |
|---|---|---|---|---|
| 5,243,374 A | * | 9/1993 | Yoshibe et al. | 396/80 |
| 5,682,559 A | * | 10/1997 | Yoshino et al. | 396/121 |
| 5,946,504 A | * | 8/1999 | Hirasawa et al. | 396/80 |
| 5,970,261 A | * | 10/1999 | Ishiguro et al. | 396/85 |
| 6,327,436 B2 | * | 12/2001 | Kawabe et al. | 396/121 |
| 2006/0033834 A1 | | 2/2006 | Matsui | |
| 2006/0083509 A1 | | 4/2006 | Shimo | |
| 2008/0247742 A1 | * | 10/2008 | Asano | 396/123 |
| 2008/0252753 A1 | * | 10/2008 | Ejima et al. | 348/231.99 |

FOREIGN PATENT DOCUMENTS
JP     10-173980 A     6/1998

* cited by examiner

*Primary Examiner* — Rodney E Fuller
(74) *Attorney, Agent, or Firm* — Canon USA Inc. IP Division

(57) ABSTRACT

Provided is an image pickup apparatus including: a zoom lens unit which moves during zooming; a focus lens unit which moves during focusing; a zoom operation switch having a function for driving the zoom lens unit; a focus detection unit for detecting a focus state on an object located in a focusing area selected from multiple focusing areas within an imaging area; and a drive unit for driving the focus lens unit based on a result obtained by detection of the focus detection unit, in which the zoom operation switch further has a function for switching the selected focusing area.

11 Claims, 5 Drawing Sheets

FIG. 3
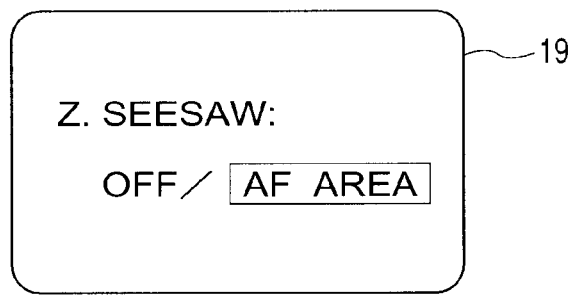
FIG. 4A  FIG. 4B  FIG. 4C
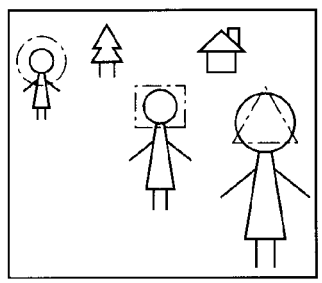 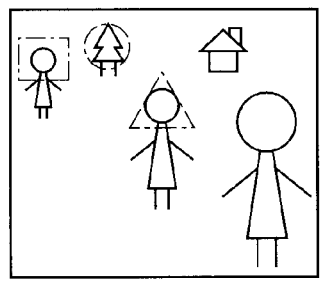 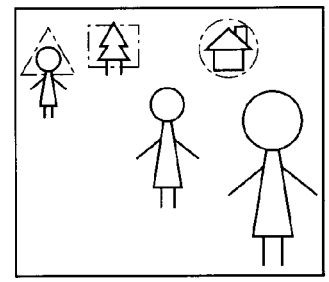
FIG. 5
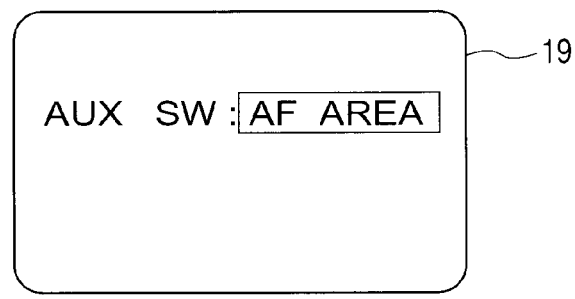

IMAGE PICKUP APPARATUS

BACKGROUND OF THE INVENTION

1. Field of the Invention

The present invention relates to an image pickup apparatus having an automatic focusing function.

2. Description of the Related Art

Up to now, a method of intentionally moving a focusing area by a photographer has been used in order to perform a further advanced focus operation in a handy type image pickup apparatus having an automatic focusing function.

US Patent Published Application No. 2006/0033834 and US Patent Published Application No. 2006/0083506 discuss a method of adjustably moving the focusing area displayed on a viewfinder by a photographer using a control unit such as a joystick or a trackball while the image pickup apparatus is mounted on a tripod.

Japanese Patent Application Laid-Open No. H10-173980 discusses a method of indicating the focusing area by bringing a finger of the photographer into direct contact with a touch panel while the image pickup apparatus is carried on the shoulder.

However, any of the conventional examples described above requires a specific unit or part for moving the focusing area, and hence the entire system is increased in size or the structure is complicated because of an increase in the number of parts. For the same reason, in order to move the focusing area by the photographer, the specific operation for moving the focusing area, such as the operation of the joystick or the finger operation of the touch panel is required. Therefore, a problem occurs that the degree of freedom of shooting reduces.

SUMMARY OF THE INVENTION

The present invention has been made to solve the problems described above. An objective of the present invention is to provide an image pickup apparatus capable of selecting a focusing area without an increase in the number of parts and a reduction in the degree of freedom of shooting.

In order to achieve the above-mentioned objective, an image pickup apparatus according to the present invention includes: a zoom electric operation unit for electrically driving a zoom lens unit; a zoom drive switch unit for switching between an electric driving of the zoom lens unit and a manual driving of the zoom lens unit; a focus detection unit for detecting a focus state on an object located in each of multiple focusing areas within an imaging area; an area selection unit for selecting a focusing area from the multiple focusing areas; and an automatic focusing unit for driving a focus lens unit to bring an object located in the focusing area selected by the area selection unit into an in-focus state, in which when the zoom drive switch unit selects the manual driving of the zoom lens unit, the zoom electric operation unit functions as the area selection unit.

Further features of the present invention will become apparent from the following description of exemplary embodiments with reference to the attached drawings.

BRIEF DESCRIPTION OF THE DRAWINGS

FIG. 3 is a front view illustrating a panel of a setting unit.

FIGS. 4A, 4B, and 4C illustrate displays on a viewfinder of a camera apparatus.

FIG. 5 is a front view illustrating a panel of the setting unit.

DESCRIPTION OF THE EMBODIMENTS

The present invention is described in detail with reference to illustrated embodiments.

Embodiment 1

Figure 1:
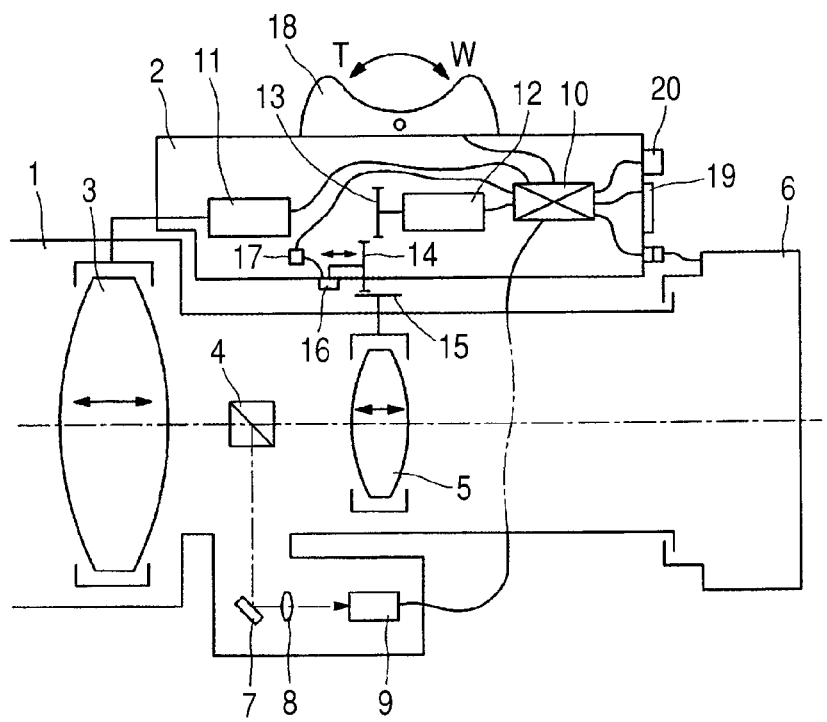
FIG. 1 is a block circuit structural diagram according to Embodiment 1 of the present invention.

FIG. 1 is a block circuit structural diagram illustrating an image pickup apparatus according to Embodiment 1. The image pickup apparatus illustrated in FIG. 1 includes an automatic focusing lens based on a so-called phase difference method. A drive unit 2 is attached to a lens main body 1. In the lens main body 1, a focus lens unit (focusing lens unit) 3, a half mirror 4, and a zoom lens unit (magnification-varying lens unit) 5 are arranged along an optical axis. A camera main body 6 is provided in the rear of the lens main body 1. A mirror 7, an image pickup lens 8, and a through camera lens (TCL) module 9 are arranged in a reflection direction of the half mirror 4.

The drive unit 2 contains a control circuit 10. An output of the TCL module 9 is connected to the control circuit 10. Outputs of the control circuit 10 are connected to a focus drive actuator 11 and a zoom drive actuator 12. An output of the focus drive actuator 11 is connected to the focus lens unit 3. An output of the zoom drive actuator 12 is connected to the zoom lens unit 5 through an actuator gear 13, an idler gear 14, and a zoom operation ring 15. The actuator gear 13 and the idler gear 14 are connected to or disconnected from each other by a zoom drive switch unit (unit or switch) 16 including a clutch. The movement of the zoom drive switch unit 16 may be detected by a detector 17. Further, a zoom electric operation unit 18 including a zoom electric operation switch and a seesaw switch, a setting unit 19, an AUX switch 20 serving as a supplementary switch, and electrical parts of the camera main body 6 are connected to the control circuit 10.

Ranging information of an object (that is, light from the object) is led to the TCL module 9 through the half mirror 4, the mirror 7, and the image pickup lens 8. In the TCL module 9, CCD sensors are arranged alternately in an A-column and a B-column. The ranging, that is, the measuring of the distance between the object in the focusing area and the image pick apparatus, is performed based on the principle of triangulation.

The ranging information of the object which is obtained by the TCL module 9 is transmitted to the control circuit 10 of the drive unit 2. A command signal for focusing is transmitted to the focus drive actuator 11. The focus drive actuator 11 and the focus lens unit 3 are mechanically connected to each other. When the focus drive actuator 11 is driven by a predetermined amount, the focus lens unit 3 is moved in an optical axis direction through a drive mechanism such as a screw feed mechanism, to thereby achieve an in-focus state.

The zoom lens unit 5 is mechanically connected to the zoom operation ring 15 of the lens main body 1. A drive gear is provided in an outer circumference portion of the zoom operation ring 15. The idler gear 14 is provided in the drive unit 2 to connect the zoom operation ring 15 and the actuator gear 13. The actuator gear 13 is connected to the zoom drive actuator 12, and hence a driving force of the zoom drive actuator 12 is transferred (as rotational driving force or rotational force) to the zoom operation ring 15 through the actuator gear 13 and the idler gear 14.

A photographer uses the zoom drive switch unit 16 to move the idler gear 14 in the optical axis direction based on a shooting condition. Therefore, the idler gear 14 is connected to or disconnected from the actuator gear 13 to switch between electric driving and manual driving of the zoom lens unit. At this time, the connection between the idler gear 14 and the zoom operation ring 15 is always maintained in any case. When the idler gear 14 is connected to the actuator gear 13, an electric zoom mode is set. When the idler gear 14 is disconnected from the actuator gear 13 as illustrated in FIG. 1, a manual zoom mode is set.

The electric zoom mode in which the zoom lens unit is electrically driven is a mode in which the zoom electric operation unit 18 is operated to drive the zoom lens unit 5 by a motor or the like, to thereby change a focal length of the entire optical system for zooming. In other words, the electric zoom mode is a mode in which zooming is performed by the zoom electric operation unit 18 or a mode in which the zoom lens unit 5 is driven by a motor or the like based on a command value from the zoom electric operation unit 18.

The manual zoom mode in which the zoom lens unit is driven manually is a mode in which zooming is performed using an operation unit such as the zoom operation ring 15, which is different from the zoom electric operation unit 18. As in this embodiment, it is desirable to mechanically connect the zoom operation ring 15 to the zoom lens unit 5. Even when the zoom lens unit 5 is moved by a motor based on the amount of rotation of the zoom operation ring 15, there is no problem.

The electric zoom mode in which the zooming is performed by the operation of the zoom electric operation unit 18 and the manual zoom mode in which the zooming is performed by the operation of the zoom operation ring 15 are switched using the zoom drive switch unit described above. During the electric zoom mode, the zoom electric operation unit may serve to operate zooming. During the manual zoom mode, the zoom electric operation unit may serve to switch a focusing area. In other words, the function of the zoom electric operation unit may be switched by the operation of the zoom drive switch unit.

During the electric zoom mode in this embodiment, the zoom lens unit 5 is driven for zooming by the zoom electric operation unit 18. However, the image of the object may be enlarged or reduced by image processing while the zoom lens unit 5 is fixed.

In this case, the switching of the zoom drive switch unit 16 is detected by the detector 17 to recognize an electric zoom mode/manual zoom mode state. A result obtained by detection is transmitted to the control circuit 10. When the photographer operates the zoom electric operation unit 18 during zooming in the electric zoom mode, a command indicating a command value corresponding to the amount of press is transmitted to the control circuit 10. A command signal for driving the zoom lens unit is sent to the zoom drive actuator 12 in response to the transmitted command. The zoom electric operation unit 18 can be movable along an arc in directions indicated by arrows so as to be capable of performing a two-way press operation. When the zoom electric operation unit 18 is tilted to one side (one operation is performed), the zoom lens unit 5 moves in a telephoto direction. When the zoom electric operation unit 18 is tilted to the other side (the other operation is performed), the zoom lens unit 5 moves in a wide-angle direction.

Figure 2:
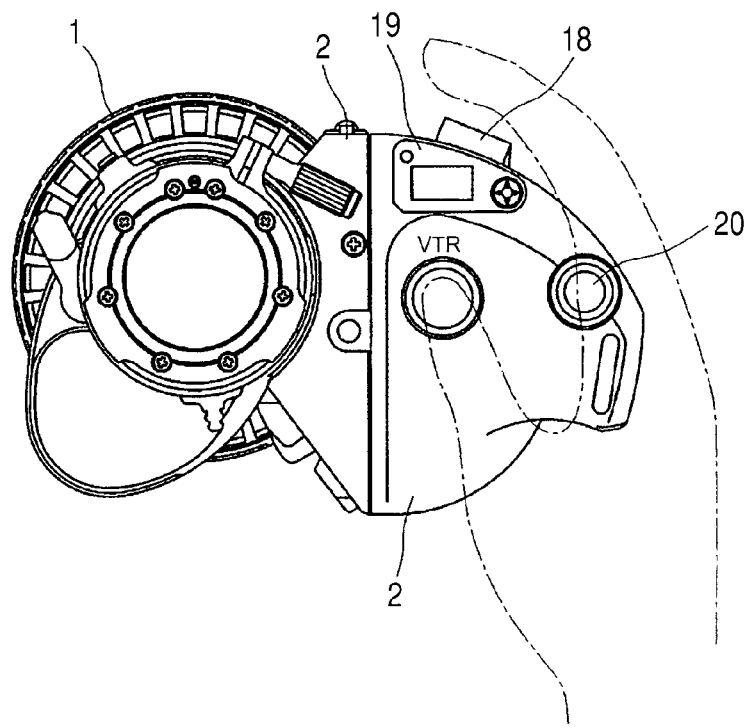
FIG. 2 is a rear surface view illustrating a drive unit.

As illustrated in FIG. 2, the drive unit 2 is provided with the setting unit 19 such as a panel, which is capable of arbitrarily setting various shooting parameters such as switch assignment information and an electric zoom speed by the photographer.

As illustrated in FIG. 3, a menu for assigning, to the movement operation of the focusing area, the function of the zoom electric operation unit 18 in the manual zoom mode is provided to the setting unit 19. In this embodiment, a state in which the menu is enabled is set. Setting information of the setting unit 19 is transmitted to the control circuit 10, and hence the assignment is performed such that the operation of the zoom electric operation unit 18 functions to move the focusing area. Note that there are plural of focusing areas in the imaging area. When performing an automatic focusing operation, the focus state on an object in one of (or in a part of) the focusing area among the multiple focusing areas is detected to thereby perform the automatic focusing operation (or to move the focus lens unit) based on the detection.

As a result, when the photographer operates the zoom electric operation unit 18, the control circuit 10 sends, to the camera main body 6, a command signal for moving the automatic focusing area displayed on a viewfinder provided in the camera main body 6, based on the details of operation of the zoom electric operation unit 18. In FIG. 3, while the menu is disabled, that is, while an OFF value is set for the automatic focusing area, even when the photographer operates the zoom electric operation unit 18, the control circuit 10 does not respond to the operation. In other words, the control circuit 10 does not send the command signal for moving the automatic focusing area and the command signal for driving the zoom drive actuator 12 and thus does not perform any operation.

FIGS. 4A to 4C illustrate typical examples of states of objects displayed on the viewfinder of the camera main body 6. As described above, by ranging as a result obtained by phase difference detection by the phase difference method, all distance information corresponding to the focus states of the respective objects becomes obvious. As illustrated in FIG. 4A, a reference automatic focusing area for focus operation which is located in the center of an imaging area at the time of starting shooting, a mark for a front focus object which is located closest to the reference automatic focusing area on a near side, and a mark for a rear focus object which is located closest to the reference automatic focusing area on a far side are displayed on the viewfinder. In this embodiment, different shapes are used for the respective marks to display multiple automatic focusing areas. For example, the reference automatic focusing area is marked with an open square, the front focus object is marked with an open triangle, and the rear focus object is marked with an open circle. Note that marks which have the same shape but different colors may be displayed. The number of display points for each of the front focus object and the rear focus object may be not only one but also two or more for each of the front- and rear-focus objects.

As described above, in the manual zoom mode using the setting unit 19, the automatic focusing area movement function is assigned to the zoom electric operation unit 18. When the photographer operates the zoom electric operation unit 18 in a T-direction to perform area selection, as illustrated in FIG. 4B, the reference automatic focusing area is moved from a person located at the center to a person located closest on a rear side of the object which is presently in the reference automatic focusing area.

When the zoom electric operation unit 18 is operated in the T-direction again, as illustrated in FIG. 4C, the reference automatic focusing area is moved to a tree which is an object located closest on a rear side of the object which is presently in the reference automatic focusing area. When any operation is not performed by the photographer during a predetermined time period after the movement of the reference automatic focusing area, the control circuit 10 recognizes that the reference automatic focusing area has reached a desired area. Then, an actual automatic focusing detection or focusing operation starts. The predetermined time is arbitrarily set using the setting unit 19 by the photographer. Within the predetermined time, the reference automatic focusing area is moved in a depth direction at any time by the number of presses of the zoom electric operation unit 18 which is operated in the T-direction by the photographer.

In contrast to this, when the photographer operates the zoom electric operation unit 18 in a W-direction, the reference automatic focusing area is moved to a person located closest on a front side of the object which is presently in the reference automatic focusing area. A relationship between the T/W directions of the zoom electric operation unit 18 and the moving directions of the automatic focusing area may be reversed to the relationship in this embodiment, and such setting may be performed by the setting unit 19.

The case where the automatic focusing area is moved by the zoom electric operation unit 18 during the manual zoom mode is described. However, there is a case where the automatic focusing area is moved by the zoom electric operation unit 18 during the electric zoom mode.

A function assigned to the AUX switch 20 of the drive unit 2 may be changed by the setting unit 19. For example, a function associated with a video recording, a return, or the movement of the automatic focusing area may be assigned. In an example illustrated in FIG. 5, the function associated with the movement of the automatic focusing area is assigned to the AUX switch 20. When the photographer presses the AUX switch 20, the automatic focusing area movement function is assigned to the zoom electric operation unit 18 as described above even in the case of the electric zoom mode. When the AUX switch 20 is pressed again after desired focusing is realized, an original zoom operation function is assigned again to the zoom electric operation unit 18.

Figure 6:
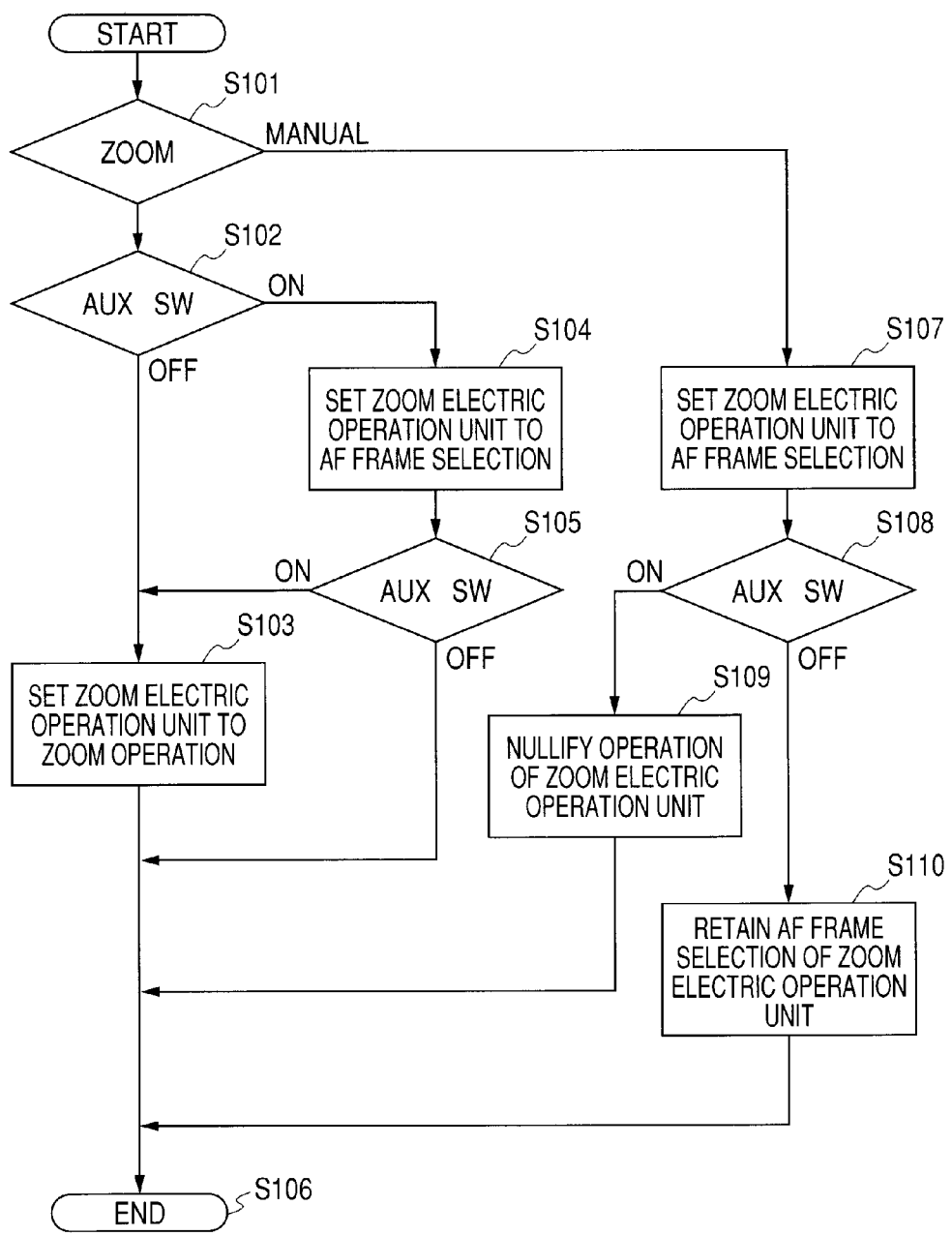
FIG. 6 is a flowchart illustrating cases where functions are assigned to a zoom electric operation unit.

FIG. 6 is a flowchart illustrating the case where the zoom operation function is assigned to the zoom electric operation unit 18 and the case where the automatic focusing area movement function is assigned thereto. First, whether the zoom mode is the electric drive mode or the manual drive mode is determined in Step S101.

In the case of the electric zoom mode, whether or not the AUX switch 20 is pressed to be turned ON is determined in Step S102. When the AUX switch 20 is pressed to be turned ON, processing goes to Step S104 and the automatic focusing area movement function is assigned to the zoom electric operation unit 18. When it is determined in Step S105 that the AUX switch 20 is pressed to be turned ON again, processing goes to Step S103 and a normal zoom operation function is assigned to the zoom electric operation unit 18. When it is determined in Step S102 that the AUX switch 20 is not pressed and remains in an OFF state, processing goes to Step S103 and the normal zoom operation function is assigned to the zoom electric operation unit 18. Then, processing is completed in Step S106.

When the manual zoom mode is determined in Step S101, processing goes to Step S107 and the automatic focusing area (AF area) movement function is assigned to the zoom electric operation unit 18. Then, processing goes to Step S108. When it is determined in Step S108 that the AUX switch 20 is not pressed, that is, when the AUX switch 20 is not operated because of the selection of the manual zoom mode, processing goes to Step S110. Then, processing is completed in Step S106 while the zoom electric operation unit 18 retains an automatic focusing area selection function. Note that the phrase "the AUX switch 20 is in the OFF state" means that the AUX switch 20 is not operated or the AUX switch 20 is operated an even number of times.

Next, when the AUX switch 20 is pressed during the manual zoom mode, processing goes to step S109. Then, the assignment of the automatic focusing area movement function to the zoom electric operation unit 18 is cancelled, and hence the operation itself of the zoom electric operation unit 18 is nullified. Note that the case where the AUX switch 20 is operated is a case where the AUX switch 20 is operated an odd number of times, including a case where the AUX switch 20 is operated or pressed one time. Steps S108, S109, and S110 may be omitted. In other words, in the case of the manual zoom mode, the automatic focusing area selection function may be always assigned to the zoom electric operation unit 18.

Even after processing reaches END of Step S106, the function of the zoom electric operation unit 18 may be changed as appropriate by the operation of the AUX switch 20. When manual zooming is switched to electric zooming or when electric zooming is switched to manual zooming, processing may be returned to Step S101 again or returned as appropriate to Step S102, S105, or S108.

Figure 7:
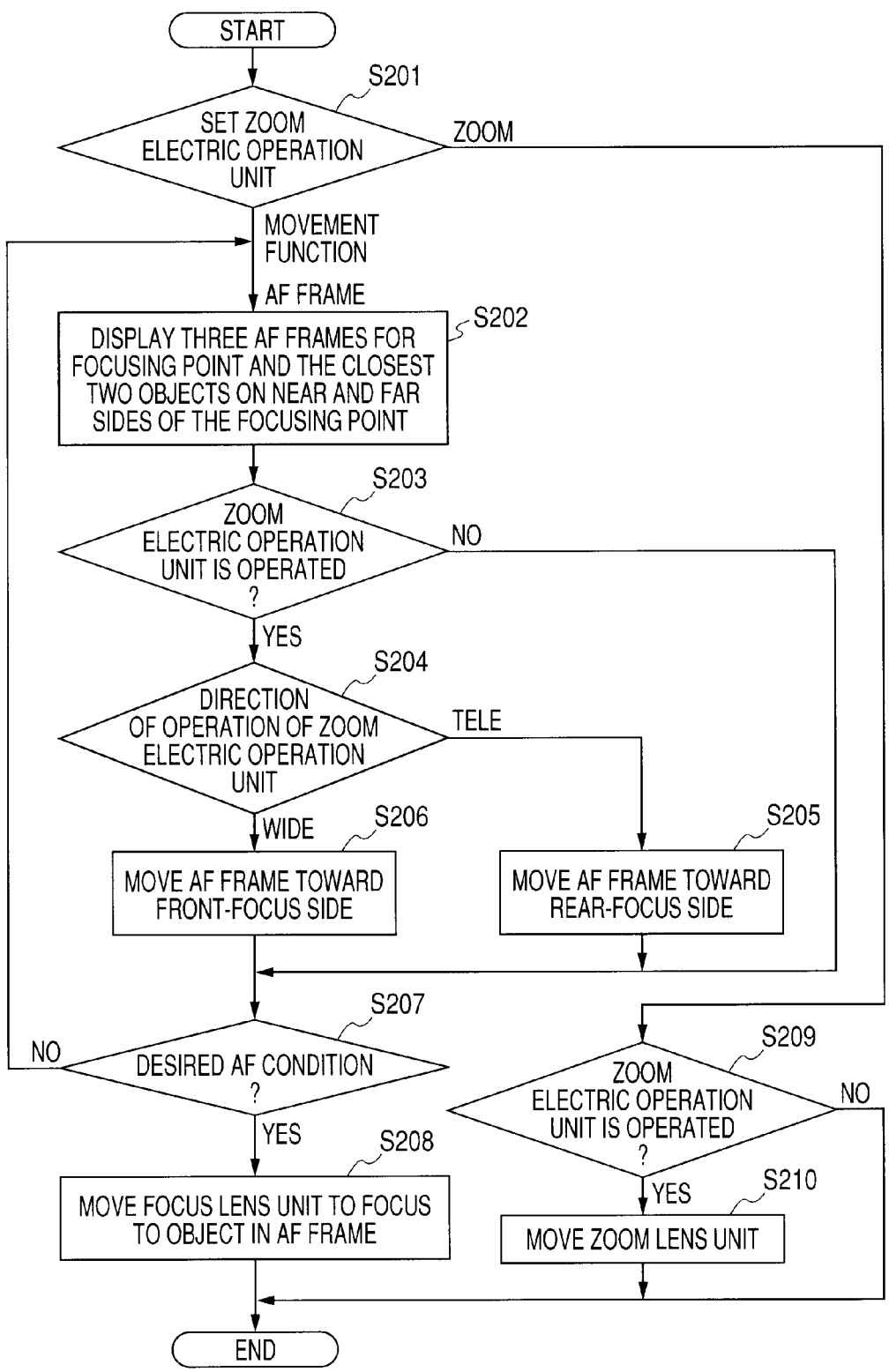
FIG. 7 is a flowchart illustrating the entire operation according to Embodiment 1 of the present invention.

FIG. 7 is a flowchart illustrating processing after the zoom operation function or the automatic focusing area (AF frame) selection function is assigned to the zoom electric operation unit 18 in Step S103 illustrated in FIG. 6. In Step S201, when the automatic focusing area movement function is assigned to the zoom electric operation unit 18, processing goes to Step S202. In Step S202, automatic focusing areas are displayed in a reference automatic focusing position and on closest two objects located on the near and far sides of the reference automatic focusing position. Then, whether or not the zoom electric operation unit 18 is operated is determined in Step S203. When the zoom electric operation unit 18 is operated, processing goes to Step S204. When the zoom electric operation unit 18 is not operated, processing goes to Step S207 described later.

When the zoom electric operation unit 18 is operated, whether the operation direction of the zoom electric operation unit 18 is the T-direction (telephoto direction) or the W-direction (wide-angle direction) is determined in Step S204. When the zoom electric operation unit 18 is operated in the T-direction, processing goes to Step S205, and hence the automatic focusing area is moved in a depth direction, that is, a rear focus direction which is a direction away from the camera and lens. When the zoom electric operation unit 18 is operated in the W-direction, processing goes to Step S206, and hence the automatic focusing area is moved in a front direction, that is, a front focus direction which is a direction approaching the camera and lens. Note that the T-direction and the W-direction may be reversed to each other.

Then, when it is determined in Step S207 that a desired automatic focusing (AF) condition is achieved by the photographer, processing goes to Step S208. With respect to whether or not the desired automatic focus condition is achieved in Step S207, when a time period during which the zoom electric operation unit 18 is not operated exceeds a predetermined time, it may be determined that the desired automatic focusing condition is achieved. The determination may be made by another method. The achievement of the desired automatic focus condition indicates not that the focus lens unit 3 is actually moved for focusing, but that a focusing area intended by the photographer corresponds to the automatic focusing area (AF frame) displayed on a display surface. In other words, in Step S207, the focus state of the automatic focusing area for actual focusing is determined. Even when the focus lens unit 3 is moved for focusing operation every time the automatic focusing area is moved in Step S205 or Step 206, there is no problem.

Next, in Step S208, the focus lens unit 3 is moved to focus on an object in the automatic focusing area to perform focusing operation.

When it is determined in Step S201 that the zoom operation function is assigned to the zoom electric operation unit 18, whether or not the zoom electric operation unit 18 is operated is determined in Step S209. When it is determined in Step S209 that the zoom electric operation unit 18 is operated, processing goes to Step S210 and the normal zoom operation is performed.

When a setting capable of continuously moving the automatic focusing area in a single direction in a case where the zoom electric operation unit 18 continues to be pressed in the direction for a long time is stored in advance in the control circuit 10, usability is further improved. A moving speed of the automatic focusing area which is continuously moved as described above, and an operation time of the zoom electric operation unit 18 in the single direction, which is required to realize the continuous movement, that is, the amount of press of the zoom electric operation unit 18, may be arbitrarily adjusted and changed by the photographer using the setting unit 19.

When there is only a single object within the viewfinder, the control circuit 10 recognizes object information in advance by ranging based on the phase difference method as described above. Front focus information and rear focus information with respect to a reference object are not displayed on the viewfinder. Even when the zoom electric operation unit 18 to which the automatic focusing area movement function is assigned is operated, the automatic focusing area is not moved.

When the automatic focusing area movement function is assigned to the zoom electric operation unit 18 as described above, the automatic focusing area may be moved without the requirement of specific parts and the disruption of a normal image taking style of the photographer. Therefore, the convenience of shooting and the degree of freedom thereof are improved.

Embodiment 2

Figure 8:
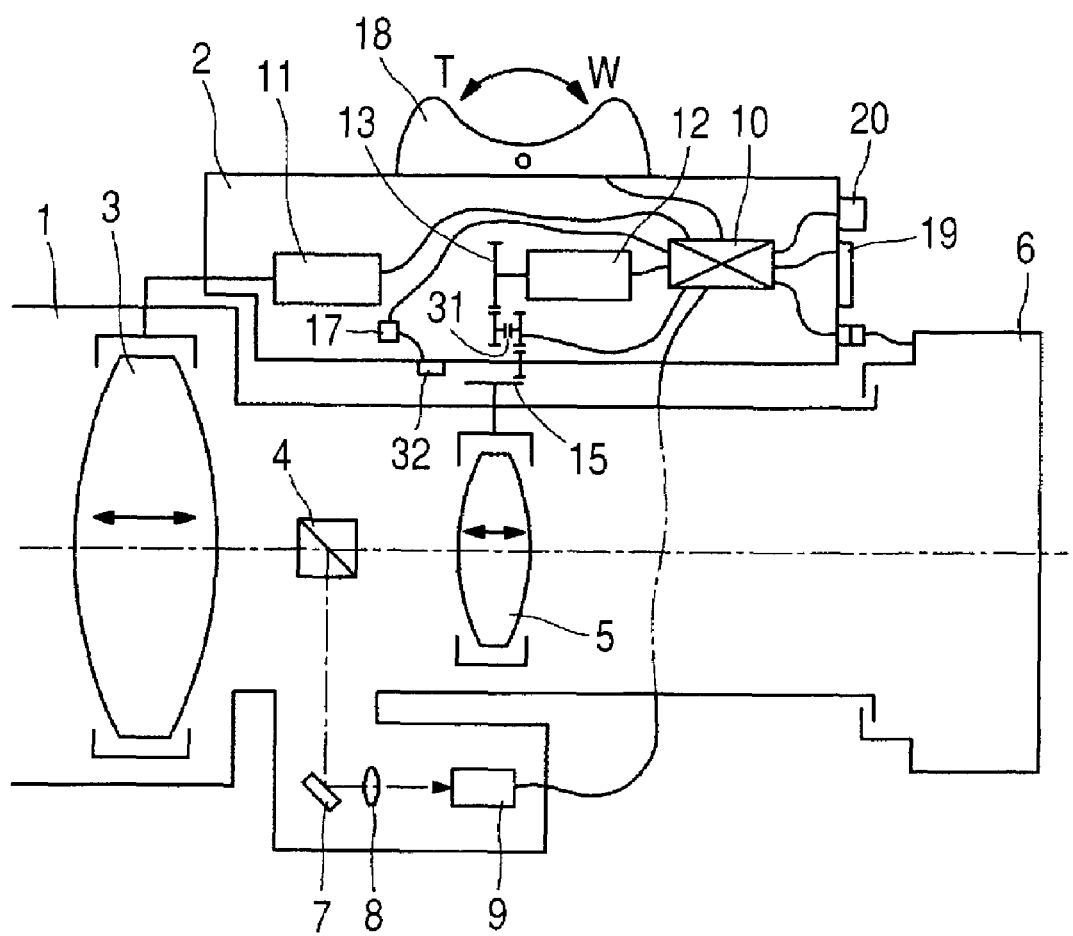
FIG. 8 is a block circuit structural diagram according to Embodiment 2 of the present invention.

FIG. 8 is a block circuit structural diagram illustrating an image pickup apparatus according to Embodiment 2. The actuator gear 13 and the zoom operation ring 15 can be switched by an electromagnetic clutch 31. Embodiment 1 describes an example of the lens apparatus of a type for selectably switching between the electric zooming and the manual zooming using the clutch by the photographer. However, the present invention may be also applied to the lens main body 1 of a type for seamlessly switching between the electric zooming and the manual zooming using the electromagnetic clutch 31 provided in the drive unit 2.

In such a case, for limited use during the manual zooming, the lens apparatus is provided with a zoom drive switch unit 32 for switching between the validity and invalidity of operation of the zoom electric operation unit 18. When the zoom drive switch unit 32 is in an invalid mode, the automatic focusing area movement function is assigned to the operation of the zoom electric operation unit 18 as described above.

The present invention is based on the automatic focusing lens using the phase difference method. However, the present invention may be applied to an automatic focusing lens using a TV-automatic focusing method. This case requires that, before shooting, the focus lens unit 1 is driven once over the entire region between a close end and an infinite end and a contrast peak value of each of objects within the viewfinder is stored to calculate a focusing length.

According to the image pickup apparatus in each of the embodiments, the automatic focusing area may be selected using the existing operation member without providing specific members. Therefore, the convenience of the focus operation may be improved without an increase in the number of parts and a reduction in the degree of freedom of image taking by a photographer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-267492, field Oct. 16, 2008, which is hereby incorporated by reference herein in its entirety.

What is claimed is:

1. An image pickup apparatus, comprising:
    a zoom lens unit which moves during zooming;
    a focus lens unit which moves during focusing;
    a zoom operation switch which is operated for driving the zoom lens unit;
    a focus detection unit for detecting a focus state on an object located in a focusing area selected from multiple focusing areas within an imaging area; and
    a drive unit for driving the focus lens unit based on a result obtained by detection of the focus detection unit;
    wherein the zoom operation switch further has a function for switching the selected focusing area, and
    wherein a target area for detecting the focus state by the focus detection unit is switched from the selected focusing area to a focusing area located on a near side relative to the selected focusing area based on one operation of the zoom operation switch, and
    the target area is switched from the selected focusing area to a focusing area located on a far side relative to the selected focusing area based on the other operation of the zoom operation switch.

2. An image pickup apparatus according to claim 1, further comprising:
    a zoom operation ring for operating the zoom lens unit; and
    an actuator for rotating the zoom operation ring based on an operation of the zoom operation switch.

3. An image pickup apparatus according to claim 2, further comprising a switch unit for switching between an electric zoom mode for driving the zoom lens unit based on the operation of the zoom operation switch and a manual zoom mode for driving the zoom lens unit based on an operation of the zoom operation ring.

4. An image pickup apparatus according to claim 3, further comprising a supplementary switch for switching the function of the zoom operation switch between the function for driving the zoom lens unit and the function for switching the selected focusing area when the manual zoom mode is set by the switch unit.

5. An image pickup apparatus according to claim 1, further comprising
    a supplementary switch for switching the function of the zoom operation switch between the function for driving the zoom lens unit and the function for switching the selected focusing area.

6. An image pickup apparatus, comprising:
a zoom electric operation unit for electrically driving a zoom lens unit;
a zoom drive switch unit for switching between an electric driving of the zoom lens unit and a manual driving of the zoom lens unit;
a focus detection unit for detecting a focus state on an object located in each of multiple focusing areas within an imaging area;
an area selection unit for selecting a focusing area from the multiple focusing areas; and
an automatic focusing unit for driving a focus lens unit to bring an object located in the focusing area selected by the area selection unit into an in-focus state,
wherein when the manual driving of the zoom lens unit is selected by the zoom drive switch unit, the zoom electric operation unit functions as the area selection unit.

7. An image pickup apparatus according to claim 6, wherein
the zoom electric operation unit in a state where the manual driving of the zoom lens unit is selected may perform a two-way press operation, and the area selection unit may select a focusing area located on a near side or a focusing area located on a far side relative to a focusing area on which the focusing unit is focused, based on the two-way press operation.

8. An image pickup apparatus according to claim 6, wherein a moving speed of the focusing area is changeable based on a press amount of the zoom electric operation unit.

9. An image pickup apparatus according to claim 6, further comprising a supplementary switch,
wherein when the electric driving of the zoom lens unit is selected, a mode for causing the zoom electric operation unit to perform zooming and a mode for causing the zoom electric operation unit to function as the area selection unit are switched by an operation of the supplementary switch.

10. An image pickup apparatus, comprising:
a zoom lens unit which moves during zooming;
a focus lens unit which moves during focusing;
a zoom operation switch which is operated for driving the zoom lens unit;
a focus detection unit for detecting a focus state on an object located in a focusing area selected from multiple focusing areas within an imaging area;
a drive unit for driving the focus lens unit based on a result obtained by detection of the focus detection unit;
a zoom operation ring for operating the zoom lens unit;
an actuator for rotating the zoom operation ring based on an operation of the zoom operation switch; and
a switch unit for switching between an electric zoom mode for driving the zoom lens unit based on the operation of the zoom operation switch and a manual zoom mode for driving the zoom lens unit based on an operation of the zoom operation ring,
wherein the zoom operation switch further has a function for switching the selected focusing area.

11. An image pickup apparatus according to claim 10, further comprising a supplementary switch for switching the function of the zoom operation switch between the function for driving the zoom lens unit and the function for switching the selected focusing area when the manual zoom mode is set by the switch unit.

* * * * *